(12) United States Patent
Sugino et al.

(10) Patent No.: US 6,910,453 B2
(45) Date of Patent: Jun. 28, 2005

(54) AUTOMOTIVE INTERNAL COMBUSTION ENGINE CONTROL SYSTEM

(75) Inventors: Soichi Sugino, Saitama (JP); Tsukasa Takahashi, Saitama (JP); Yorinori Kumagai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/782,949

(22) Filed: Feb. 23, 2004

(65) Prior Publication Data

US 2004/0173174 A1 Sep. 9, 2004

(30) Foreign Application Priority Data

Mar. 4, 2003 (JP) .................................... 2003-057313
Mar. 4, 2003 (JP) .................................... 2003-057314

(51) Int. Cl.$^7$ ................................................ F02N 11/04
(52) U.S. Cl. ..................... 123/179.28; 74/7 E; 290/31
(58) Field of Search ................... 123/179.28, 179.25; 474/5, 7, 133, 134, 135; 74/7 E; 290/31

(56) References Cited

U.S. PATENT DOCUMENTS

| | | | | | |
|---|---|---|---|---|---|
| 1,501,520 | A | * | 7/1924 | Chryst ....................... 290/38 R |
| 1,882,022 | A | * | 10/1932 | Leyvastre ..................... 290/31 |
| 4,870,875 | A | * | 10/1989 | Morishita .................... 475/153 |
| 5,418,400 | A | * | 5/1995 | Stockton ....................... 290/46 |
| 6,378,479 | B1 | * | 4/2002 | Nishidate et al. ...... 123/179.25 |
| 6,397,808 | B1 | * | 6/2002 | Tanaka et al. .......... 123/179.25 |
| 6,409,622 | B1 | * | 6/2002 | Bolz et al. ....................... 475/5 |
| 6,582,333 | B2 | * | 6/2003 | Man et al. ....................... 475/5 |
| 6,752,112 | B1 | * | 6/2004 | Ohata et al. ............. 123/179.4 |
| 2002/0045508 | A1 | * | 4/2002 | Man et al. ....................... 475/5 |
| 2002/0117860 | A1 | * | 8/2002 | Man et al. ..................... 290/46 |
| 2003/0104900 | A1 | * | 6/2003 | Takahashi et al. ............. 477/3 |

FOREIGN PATENT DOCUMENTS

| | | |
|---|---|---|
| JP | 11-23012 | 1/1999 |
| JP | 11-230012 | 8/1999 |

* cited by examiner

Primary Examiner—Henry C. Yuen
Assistant Examiner—Arnold Castro
(74) Attorney, Agent, or Firm—Westerman, Hattori, Daniels & Adrian, LLP

(57) ABSTRACT

A starting motor 5 of an internal combustion engine 1 drives an input/output pulley 10 through a belt 11. Auxiliary machinery 6, 7 and 8 is driven by the engine 1 though the belt 11 while the engine is in operation. The starting motor 5 drives the auxiliary machinery 6, 7 and 8 through the belt 11 while the engine is in standstill. A speed change mechanism 41 transmits rotation of the starting motor 5 at a high gear ratio to the engine to start the same, and transmits rotation of an engine output shaft 2 at a lower gear ratio to the motor 5 to make the motor 5 generate power while the engine is in operation. The speed change mechanism 41 overlaps the pulley 10 at least partially axially of the output shaft 2. The pulley 10 defines an oil chamber 39 for containing lubricate oil.

11 Claims, 7 Drawing Sheets

AUTOMOTIVE INTERNAL COMBUSTION ENGINE CONTROL SYSTEM

BACKGROUND OF THE INVENTION

1. Technical Field

The present invention relates to a control system for controlling power transmission from an automotive internal combustion engine and a starting motor to auxiliary machinery.

2. Description of the Related Art

Techniques for reducing the fuel consumption of an internal combustion engine have been developed and applied to practical uses. Such techniques stop an internal combustion engine mounted on a vehicle temporarily, for example, when the vehicle stops for a while to wait for the traffic light to change. Usually, auxiliary machinery, such as an air conditioner stops when the internal combustion engine stops.

If both the internal combustion engine and the air conditioner stop when the vehicle stops temporarily while the vehicle is running in traffic congestion in hot summer, the passenger compartment becomes hot and uncomfortable.

A technique disclosed in, for example, JP11-230012 A drives the auxiliary machinery by a motor when the internal combustion engine stops.

The technique disclosed in JP A 11-230012 A drives the motor for rotation in the normal direction to start the internal combustion engine and disconnects the motor from the auxiliary machinery to intercept torque transmission from the motor to the auxiliary machinery when the internal combustion engine is at a standstill, and drives the motor for rotation in the reverse direction to drive the auxiliary machinery and disconnects the motor from the internal combustion engine to intercept torque transmission from the motor to the internal combustion engine when the internal combustion engine is at a standstill.

This prior art technique does not use the motor as a power generator and does not use the motor for energy regeneration.

If it is desired to operate the air conditioner while the internal combustion engine is at a standstill, it is wiser to regenerate energy as much as possible because the air conditioner consumes much power.

The present invention has been made in view of such a problem and it is therefore an object of the present invention to provide a compact automotive internal combustion engine control system capable of driving auxiliary machinery by a starting motor while an internal combustion engine is at a standstill, of efficiently regenerating energy while the internal combustion engine is in operation, and of satisfactorily lubricating a speed-change gear.

SUMMARY OF THE INVENTION

The present invention provides, to achieve the object, an automotive internal combustion engine control system that transmits an output of a starting motor through an endless transmission belt to an input/output pulley mounted on an output shaft of an internal combustion engine in starting the internal combustion engine, transmits an output of the internal combustion engine through the endless transmission belt to auxiliary machinery while the internal combustion engine is in operation, and transmits an output of the starting motor through the endless transmission belt to the auxiliary machinery while the internal combustion engine is at an intentional stand still: wherein the starting motor has a power generating function; the automotive internal combustion engine control system includes a speed-change mechanism which transmits rotation of the starting motor to the internal combustion engine at a high first gear ratio in starting the internal combustion engine and which transmits rotation of the internal combustion engine to the starting motor at a low second gear ratio to operate the starting motor as a power generator while the internal combustion engine is in operation, the speed-change mechanism being built within the input/output pulley of the internal combustion engine.

Since the rotation of the output shaft of the starting motor is transmitted to the internal combustion engine at the high first gear ratio in starting the internal combustion engine to transmit the output of the starting motor to the auxiliary machinery wile the internal combustion engine is at an intentional standstill, the internal combustion engine can be started by the amplified drive force of the starting motor and hence the starting motor may be a small one. Since the power of the internal combustion engine is transmitted at the low second gear ratio to the starting motor to use the starting motor as a power generator, energy can be efficiently regenerated.

Since the speed-change mechanism is built within the input/output pulley, the control system can be formed in a short axial length, which is effective in forming the control system in compact construction.

According to the present invention, the speed-change mechanism is disposed so as to overlap the input/output pulley at least partially with respect to an axial direction in which the output shaft of the internal combustion engine extends. The input/output pulley defines an internal space opening in a direction opposite a direction toward the internal combustion engine, and the speed-change mechanism is received in the space.

Preferably, the speed-change mechanism includes a planetary gear including mutually meshed gears serving as a sun gear, planet pinions and a ring gear, and a carrier supporting the planet pinions for rotation, the mutually meshed gears being helical gears, a one-way clutch is interposed between a stationary part and the sun gear, and a centrifugal clutch is provided which is capable of engaging the carrier and the ring gear by the agency of centrifugal force of a predetermined level or above, and of capable of being disengaged by thrust produced by the helical gears.

Preferably, a sleeve is put on the output shaft of the internal combustion engine, a cylindrical sun gear member with the sun gear is put on the sleeve, the input/output pulley has an inner cylindrical part mounted on the output shaft of the internal combustion engine and an outer cylindrical part formed integrally with the inner cylindrical part so as to surround the latter, and the inner cylindrical part surrounds the sun gear member.

The outer cylindrical part extends in a direction opposite a direction toward the internal combustion engine such that the outer cylindrical part and the sun gear member define an annular space therein. The inside surface of the sleeve is interlocked with the carrier for torque transmission.

The annular space can receive the planet pinions, the ring gear and the centrifugal clutch.

Preferably, the speed-change mechanism comprises a planetary gear including mutually meshed gears serving as a sun gear, planet pinions and a ring gear, and a carrier supporting the planet pinions, the mutually meshed gears being helical gears, the carrier being fastened to an output shaft of the internal combustion engine, the ring gear being connected to the input/output pulley, the sun gear being interlocked with a stationary member by a one-way clutch; and a centrifugal clutch capable of engaging the carrier and the ring gear by the agency of centrifugal force that acts on weights, and of being disengaged by thrust produced by the helical gears.

Since the speed-change mechanism includes the planetary gear and the centrifugal force, which are mechanical modules, the control system is simple.

An oil chamber for containing lubricating oil can be formed inside the input/output pulley.

The control system can be formed in compact construction by forming the oil chamber for containing lubricating oil inside the input/output pulley, and the speed-change mechanism can be satisfactorily lubricated to a necessary and sufficient extent.

The input/output pulley may have an inner cylindrical part mounted on the output shaft of the internal combustion engine, an outer cylindrical part surrounding the inner cylindrical part and a flat, annular part connecting the inner and the outer cylindrical part, and the oil chamber may be defined by a cover covering an annular space defined by the input/output pulley, the inner cylindrical part, the outer cylindrical part and the flat, annular part.

DESCRIPTION OF THE PREFERRED EMBODIMENT

Figure 1:
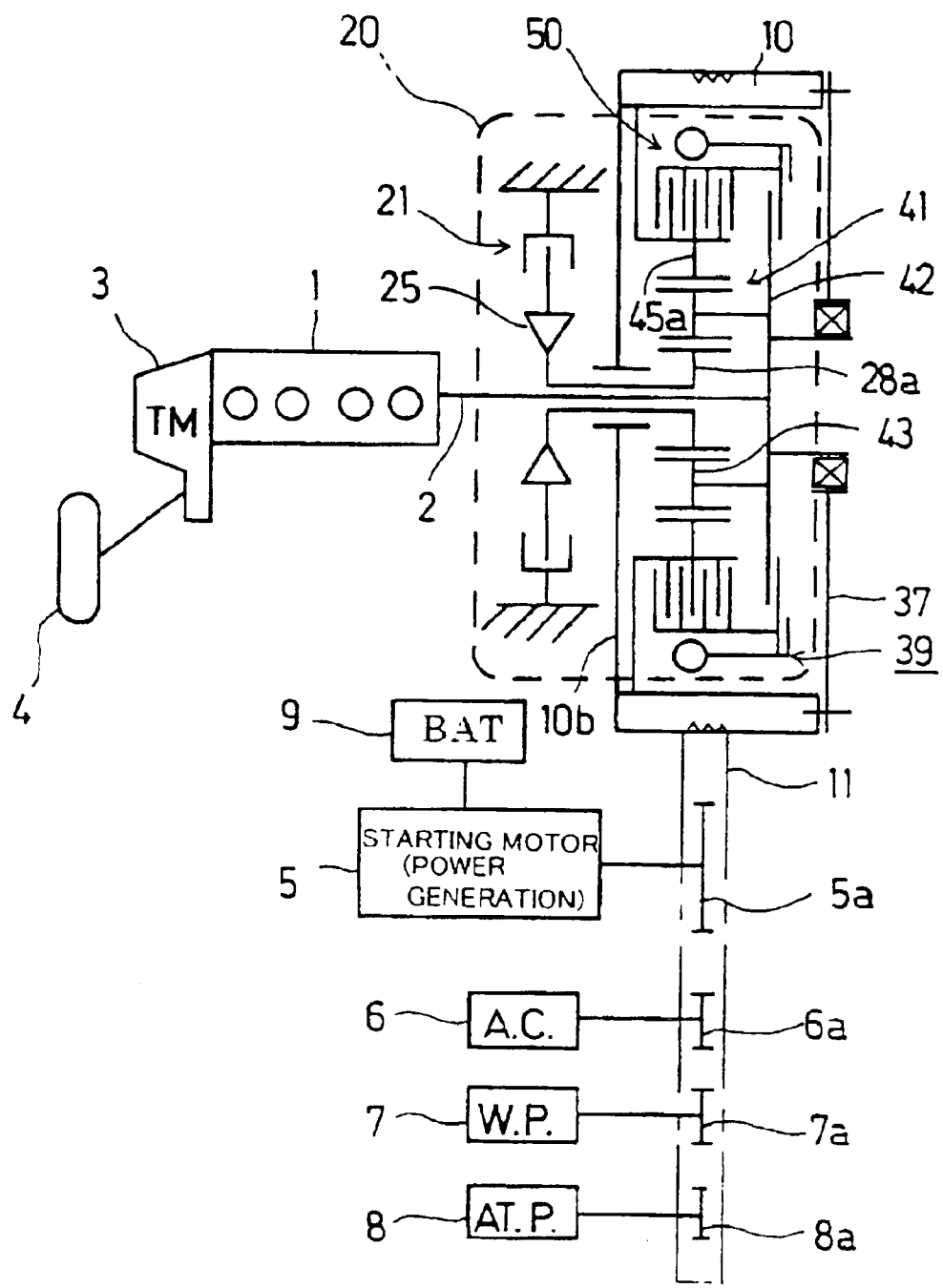
FIG. 1 is a diagrammatic view of an automotive internal combustion engine control system in a preferred embodiment of the present invention.

A preferred embodiment of the present invention will be described with reference to FIGS. 1 to 11. FIG. 1 is a diagrammatic view of an automotive internal combustion engine control system in the preferred embodiment. A vehicle is provided with an internal combustion engine 1. The internal combustion engine 1 drives drive wheels 4 through a transmission 3.

A mechanical module 20, i.e., a speed-change mechanism, is interposed between the crankshaft 2 of the internal combustion engine 1, and an input/output pulley 10. An auxiliary machinery drive belt 11 is extended around the input/output pulley 10, a pulley 5a mounted on the drive shaft of a starting motor 5 capable of serving as a power generator, and the respective driven pulleys 6a, 7a and 8a of an air conditioner 6, a water pump 7 and an oil pump 8 included in an automatic transmission for power transmission.

Electrical energy stored in a battery 9 is supplied to the starting motor 5 when an ignition switch, not shown, is operated to drive the starting motor 5. The rotation of the drive shaft of the starting motor 5 is transmitted through the auxiliary machinery drive belt 11 and the mechanical module 20 to the crankshaft 2 to start the internal combustion engine 1.

When the internal combustion engine 1 starts, the rotation of the crankshaft 2 is transmitted through the mechanical module 20 and the accessory drive belt 11 to the starting motor 5 to drive the starting motor 5 for power generation. Electric energy thus regenerated by the starting motor 5 is stored in the battery 9. At the same time, the internal combustion engine 1 drives the air conditioner 6, the water pump 7 for pumping cooling water, and the oil pump 8 of the automatic transmission through the auxiliary machinery drive belt 11.

Figure 2:
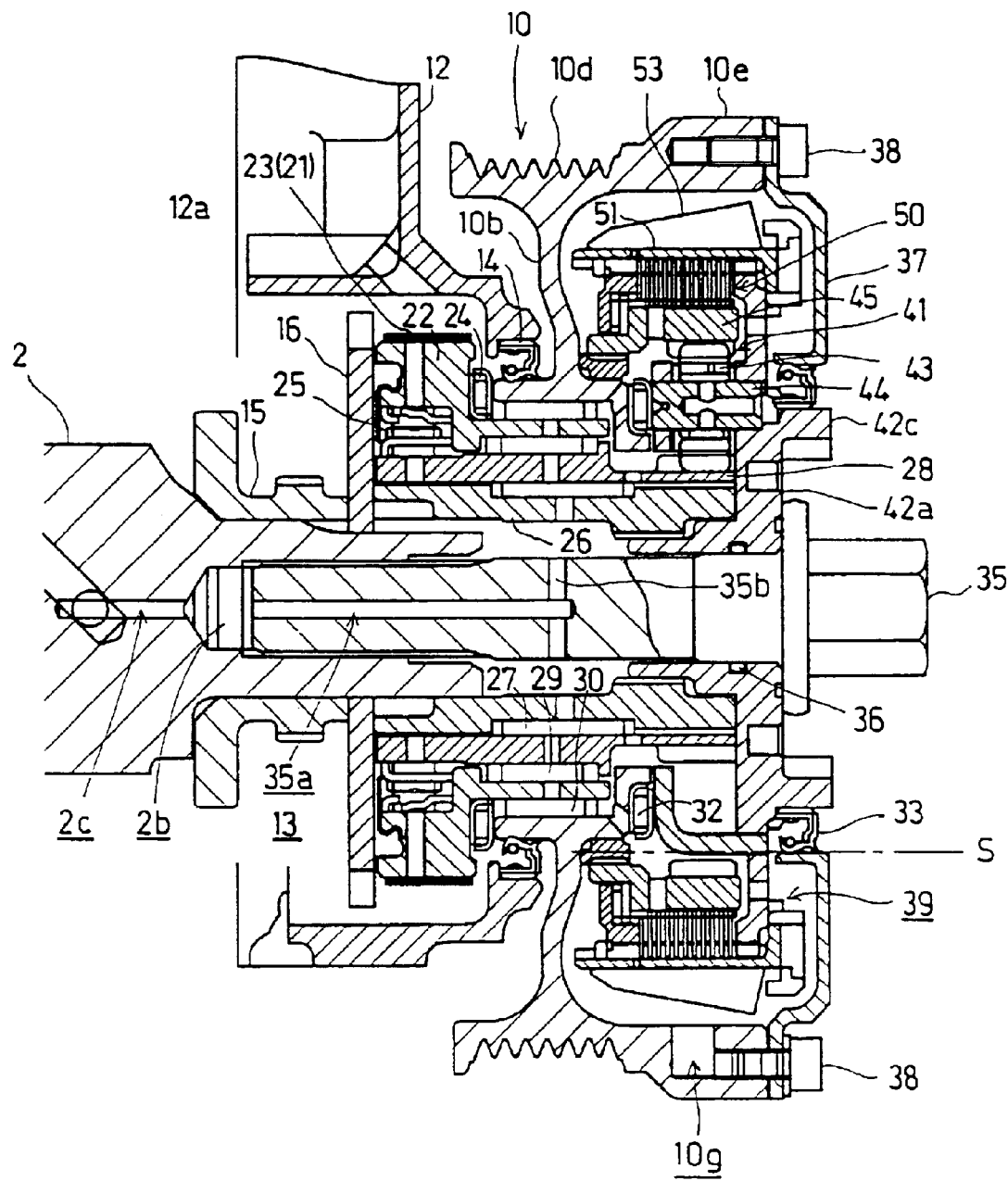
FIG. 2 is a longitudinal sectional view of mechanical modules forming the automotive internal combustion engine control system shown in FIG. 1.

The mechanical module 20 includes, in combination, a planetary gear 41, a centrifugal clutch 50, one-way clutch 25, and a band brake 21 coupled with the centrifugal cutch 50 by the one-way clutch 25. FIG. 2 shows the construction of the mechanical module 20. The construction of the mechanical module 20 will be described with reference to FIGS. 3 to 7 in order of assembling steps.

Figure 3:
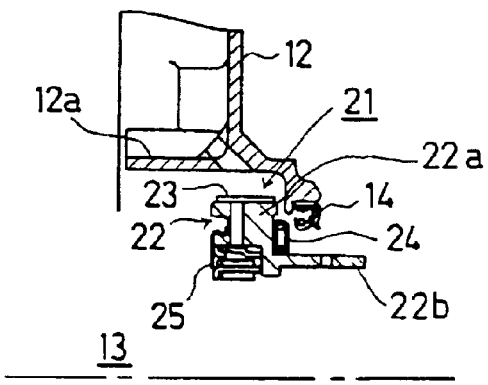
FIG. 3 is a sectional view for explaining the first step of an assembling process for assembling the mechanical module.
Figure 3:
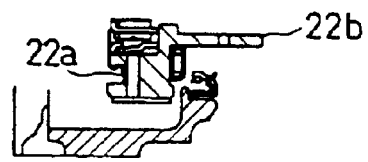

Referring to FIGS. 2 and 3, a chain case 12 is attached to a side surface of a crankcase to define a chain chamber 13. A seal ring 14 is fitted in a cylindrical part 12a of the chain case 12. A brake drum 22 having a cylindrical body 22a and included in the band brake 21 is received in a space defined by the cylindrical part 12a. The brake drum 22 can be connected to the chain case 12 by a band 23 wound around the cylindrical body 22a.

The brake drum 22 has a cylindrical projection 22b projecting from the inner circumference of the cylindrical body 22a. A thrust bearing 24 is put on the cylindrical projection 22b. A one-way clutch 25 is fitted in the cylindrical body 22a.

Figure 4:
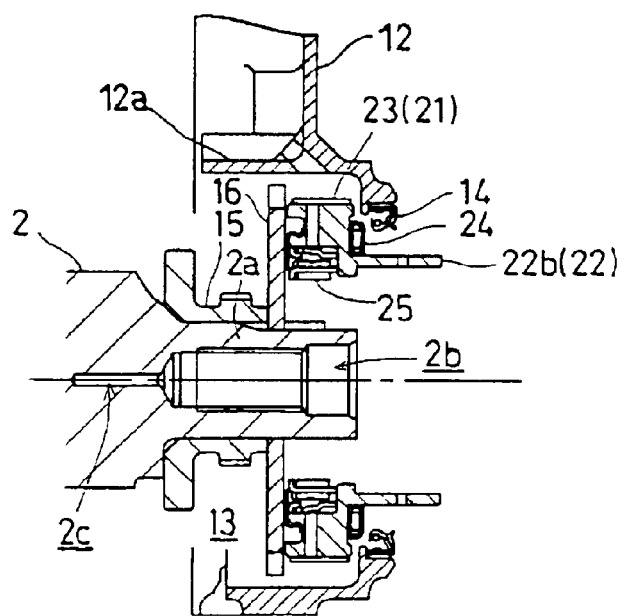
FIG. 4 is a sectional view for explaining the second step of the assembling process.

Referring to FIG. 4, the chain case assembly thus constructed is attached to the internal combustion engine 1 so as to surround the crankshaft 2. A threaded hole 2b is formed in and coaxially with a reduced end part 2a of the crankshaft 2. The threaded hole 2b is connected to an oil passage 2c formed in the crankshaft 2.

A sprocket 15 and a spur gear 16 are mounted on and splined to the reduced end part 2a of the crankshaft 2. The chain case assembly is disposed such that the cylindrical projection 12a of the chain case 12 is coaxial with the spur gear 16, and the brake drum 22 is positioned near the spur gear 16.

Figure 5:
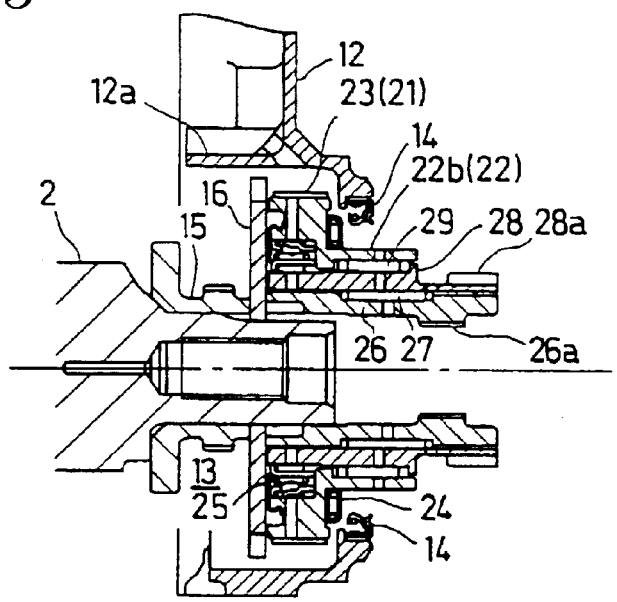
FIG. 5 is a sectional view for explaining the third step of the assembling process.

Then, as shown in FIG. 5, an assembly formed by rotatably supporting a cylindrical sun gear member 28 on a sleeve 26 by a radial bearing 27 is inserted in the brake drum 22 so that the inner end, i.e., a left end as viewed in FIG. 5, of the sleeve 26 is pressed against the spur gear 16, and a radial bearing 29 is fitted in an annular space between the sleeve 26 and the brake drum 22.

Splines 26a are formed in the inside surface of a right end part, as viewed in FIG. 5, of the sleeve 26. A helical sun gear 28a is formed in a right end part of the sun gear member 28 projecting from the cylindrical projection 22b of the brake drum 22.

Figure 6:
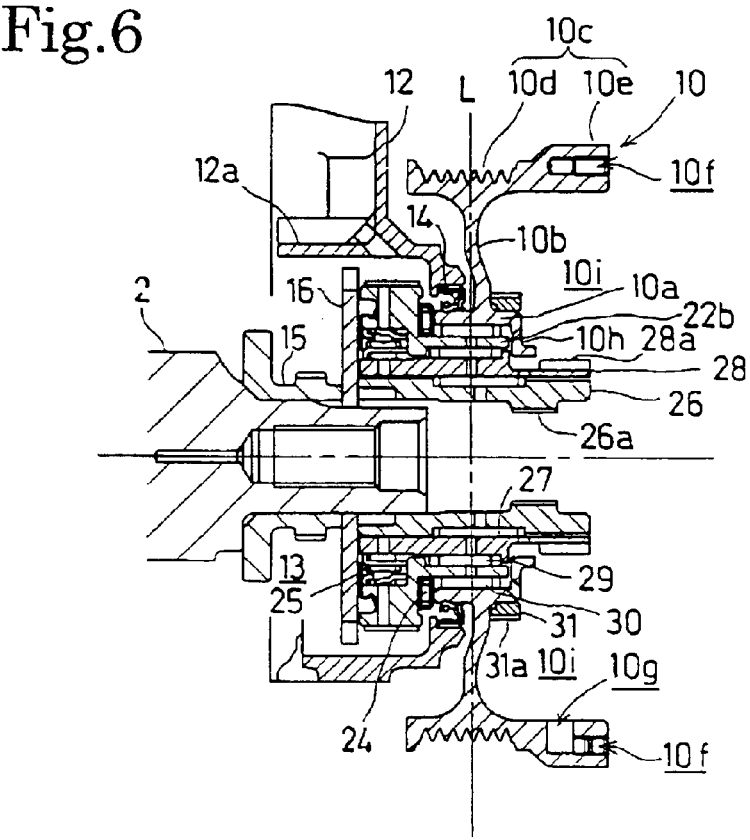
FIG. 6 is a sectional view for explaining the fourth step of the assembling process.

Then, as shown in FIG. 6, the input/output pulley 10 is supported on the cylindrical projection 22b of the brake drum 22 by a radial bearing 30 with its boss pressed against the thrust bearing 24 resting on the body part 22b of the brake drum 22.

Figure 9:
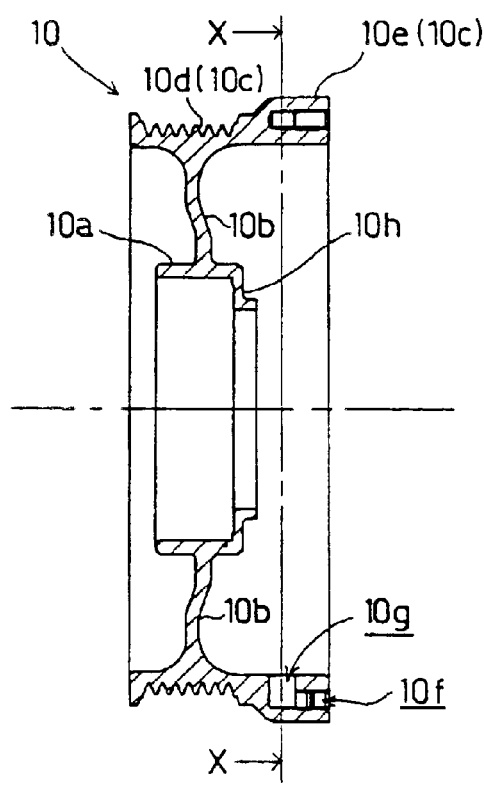
FIG. 9 is a longitudinal sectional view of an input/output pulley.

Referring to FIG. 9, the input/output pulley 10 has a substantially cylindrical hub 10a, a cylindrical rim 10c, and a flat, annular part 10b extending between the hub 10a and the rim 10c. As shown in FIG. 6, the radial bearing 30 is fitted in the space between the hub 10a and the cylindrical projection 22b of the brake drum 22. The thrust bearing 24 is held between the inner end of the hub 10a and the cylindrical body 22a of the brake drum 22. The space between the hub 10a and the cylindrical part 12a of the chain case 12 is sealed by the seal ring 14.

The rim 10c has a belting part 10d provided with a plurality of V-grooves in its outer circumference. The belting part 10d coincides substantially with the flat, annular part 10b with respect to the axial direction. The rim 10c has a cylindrical part 10e extending axially outward from the belting part 10d.

Figure 10:
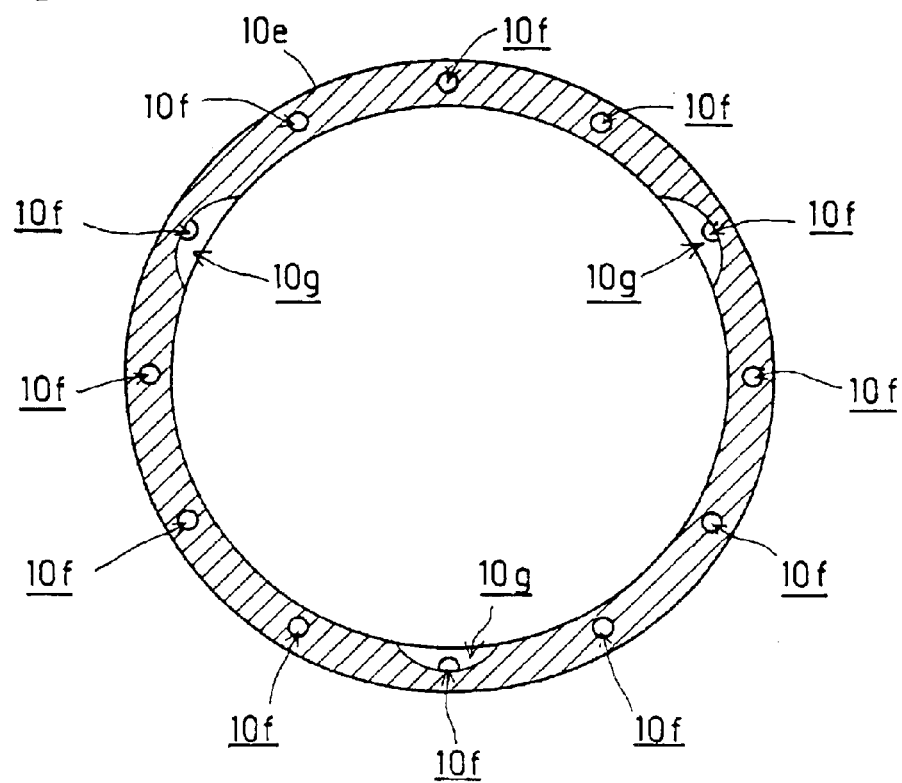
FIG. 10 is a sectional view taken on the line X—X in FIG. 9.

Referring to FIGS. 9 and 10, a plurality of threaded holes 10f are formed in the outer end surface of the cylindrical part 10e in a circumferential arrangement. Grooves 10g are formed at equal angular intervals so as to correspond to the three threaded holes 10f, respectively, in the inner circumference of the cylindrical part 10e. The grooves log have a sectional shape resembling a segment of a circle.

An outer end part of the hub 10a is reduced to form a flange 10h having an L-shaped section. As shown in FIG. 6, the flange 10h covers the cylindrical projection 22 of the brake drum 22, and the radial bearings 29 and 30.

Referring to FIG. 6, the flat, annular part 10b and the three radial bearings 27, 29 and 30 are disposed on a plane L passing the middle of the belting part 10d of the input/output pulley 10. Oil holes are formed in the sleeve 26, the sun gear member 28 and the cylindrical projection 22b of the brake drum 22 to lubricate the radial bearings 27, 29 and 30.

A splined ring 31 of a big diameter provided with splines 31a in its outer circumference is mounted on and welded to an outer end part of the hub 10a of the input/output pulley 10.

When the input/output pulley 10 is thus mounted on the brake drum 22, the bore of the sleeve 26 opens to the right as viewed in FIG. 6, and the sun gear member 28, the cylindrical part 10e and the flat, annular part 10b define an annular concave space 10i around the sleeve 26.

Figure 7:
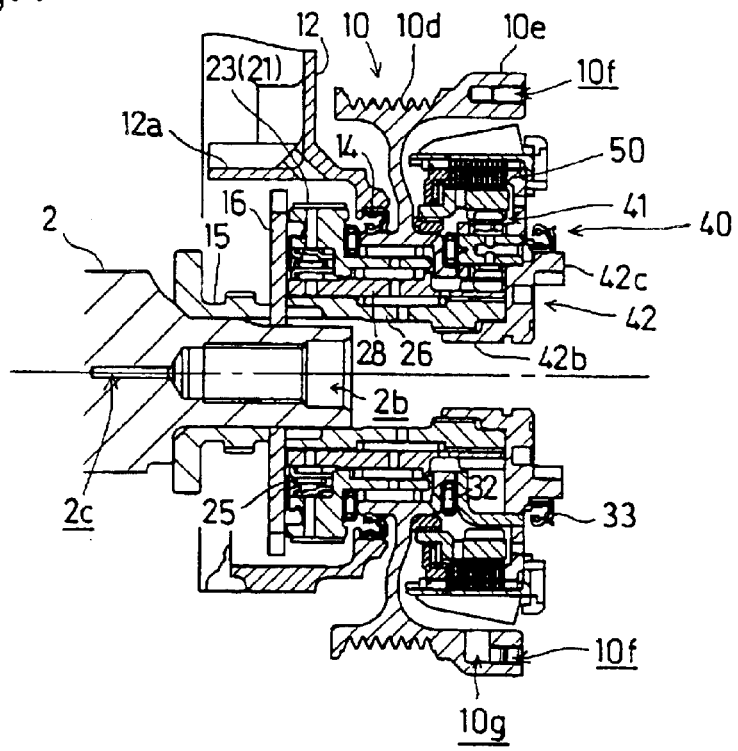
FIG. 7 is a sectional view for explaining the fifth step of the assembling process.
Figure 11:
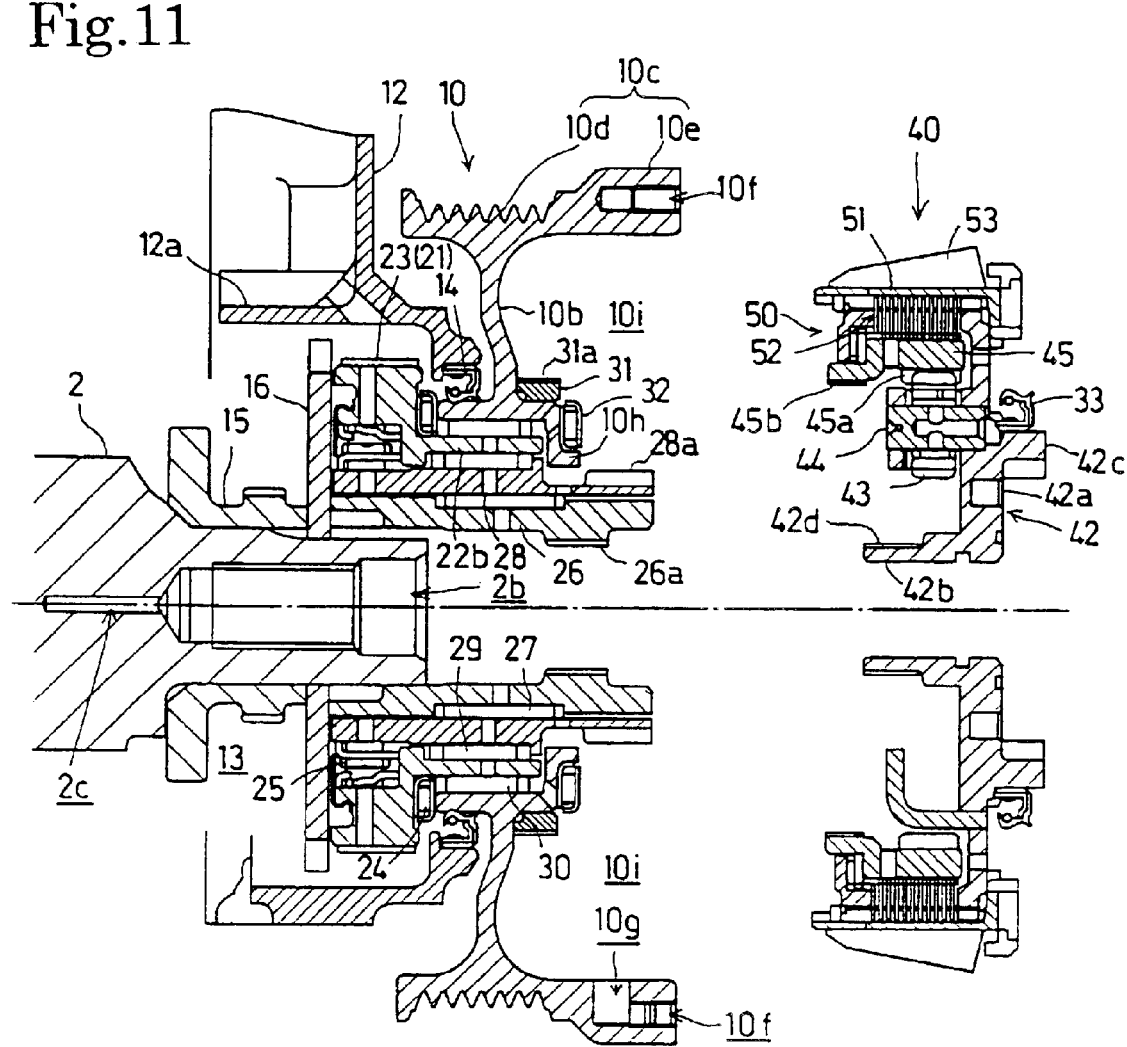
FIG. 11 is a view for explaining a carrier assembling process.

Then, as shown in FIG. 7, a carrier assembly 40 is placed in the annular space 10i. As shown in FIG. 11, the carrier assembly 40 is assembled by mounting the centrifugal clutch 50 on the carrier 42 of the planetary gear 41.

As shown in FIG. 11, the carrier 42 has a central boss 42b projecting inward from a central part of a radial, flat, annular part 42a. An engaging part provided with ridges and furrows is formed on the outer circumference of the carrier 42. A plurality of shafts 44 are projected inward, i.e., leftward, from a radially middle part of the flat, annular part 42a. The planet pinions 43 are supported for rotation on the shafts 44. A ring 42c protrudes from a radially middle part of the outer end surface, i.e., the right end surface as viewed in FIG. 11, of the flat, annular part 42a.

The planet pinions 43 are meshed with a ring gear 45a formed on a ring gear member 45. A clutch drum 51 is engaged with the engaging part of the carrier 42 so as to be axially slidable and to rotate together with the carrier 42. The centrifugal clutch 50 is interlocked with the carrier 42 and the ring gear member 45 through the cutch drum 51.

The centrifugal clutch 50 includes a multiple-disk clutch unit 52 interposed between the cutch drum 51 and the ring gear member 45, and flyweights 53 disposed on the outer circumference of the cutch drum 51 for turning together with the cutch drum 51 (and the carrier 42). The flyweights 53 are turned by centrifugal force. When the rotating speed of the clutch drum 51 exceeds a threshold rotating speed, the fly-weights 53 shifts the clutch drum 51 axially to engage the multiple-disk clutch 52.

The planet pinions 43 the ring gear 45a and the sun gear 28a of the planetary gear 41 are helical gears. The thrust produced by the helical gearing acts on the ring gear member 45 so as to push the multiple-disk clutch unit 52 axially for disengagement.

The carrier assembly 40 is assembled by arranging the components of the planet gear 41 excluding the sun gear member 28, and the centrifugal clutch 50 on the inner side, i.e., on the left side as viewed in FIG. 11, of the flat, annular part 42a of the carrier 42. As shown in FIGS. 7 and 11, the splines 42d formed in the outer circumference of the central boss 42b of the carrier 42 are to be engaged with the splines 26a of the sleeve 26, the splines 45b formed in the inner circumference of the ring gear member 45 are to be engaged with the splines 31a of the splined ring 31, and the planet pinions 43 are to be engaged with the sun gear 28a of the sun gear member 28.

Figure 8:
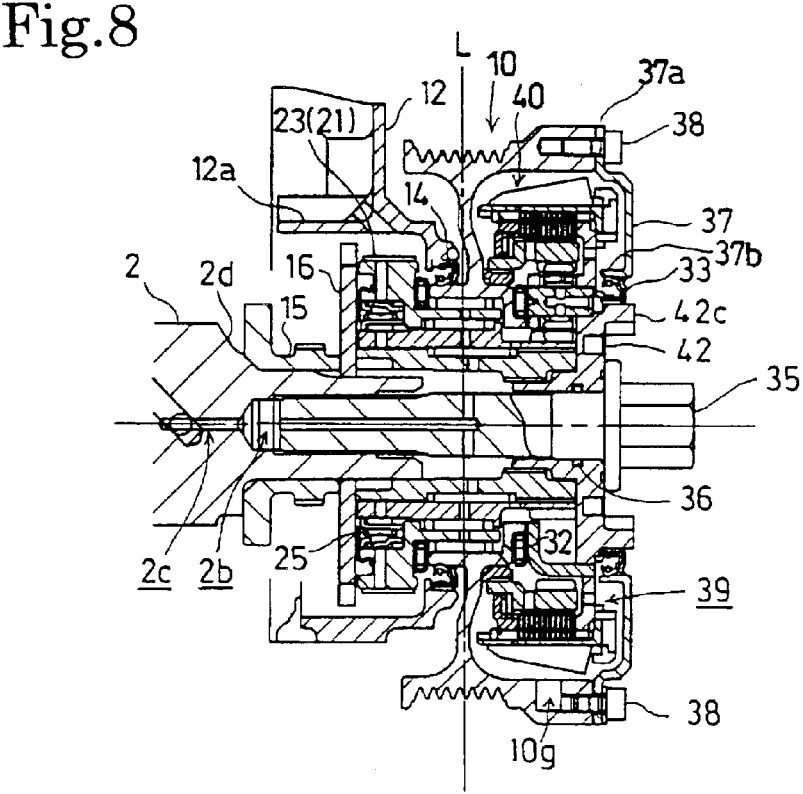
FIG. 8 is a sectional view for explaining the last step of the assembling process.

The carrier assembly 40 is installed in the annular space 10i formed around the sleeve 26 by mounting the input/output pulley 10 on the brake drum 22 such that the splines 42d and the splines 26a are engaged, the splines 45b and the splines 31a are engaged, and the planet pinions 43 and the sun gear 28a are engaged as shown in FIG. 8.

The splined ring 31 of a big diameter provided with the splines 31a is welded to the outer end part, on the side of the ring gear member 45, of the hub 10a of the input/output pulley 10. Since the splines 31a and 45b are formed on a circle of a large diameter, pressure acting on the side surfaces of the splines 31a and 45b is low, a low frictional resistance acts on the sliding movement of the splines 31a and 45b, and hence the thrust produced by the helical gearing can be transmitted to the clutch drum 51 without loss. Those component parts can be easily assembled and the construction facilitates assembling work.

After the component parts have been thus assembled, the sleeve 26 and the carrier 42 are splined for simultaneous rotation, the input/output pulley 10 and the ring gear member 45 are splined for simultaneous rotation.

The speed-change mechanism of the carrier assembly 40 is disposed inside the input/output pulley 10, the carrier assembly 40 partly overlaps the belting part 10d of the input/output pulley 10 with respect to the axial direction, and most part of the carrier assembly 40 is contained in the annular space 10i. Consequently, the internal combustion engine control system can be formed in compact construction and in a short axial length.

A thrust bearing 32 is interposed between the flange 10h of the input/output pulley 10 and the shafts 44 supported on the carrier 42. A seal ring 33 is put on the ring 42c slightly protruding from the outer end surface, i.e., the right end surface as viewed in FIG. 11, of the flat, annular part 42a.

As shown in FIG. 8, a crankshaft bolt 35 with collar, i.e., a collar bolt, is passed through the central boss 42b of the carrier 42 and is screwed in the threaded hole 2b of the crankshaft 2. An O-ring 36 is fitted in a groove formed in the inside surface of the central boss 42b to seal the space between the crankshaft bolt 35 screwed in the threaded hole 2b and the central boss 42b.

The collar of the crankshaft bolt 35 is pressed against the carrier 42 to hold the sprocket 15, the spur gear 16 and the sleeve 26 between the carrier 42 and the shoulder at the inner end of the reduced part 2c of the crankshaft 2. Thus, the carrier 42 of the planetary gear 41 rotates together with the crankshaft 2.

As shown in FIG. 2, the crankshaft bolt 35 is provided with an axial oil passage 35a of a length from its tip, and a radial oil passage 35b connected to the axial oil passage 35a. The opposite ends of the radial oil passage 35b open into a space between the sleeve 26 and the crankshaft bolt 35.

A substantially annular cover 37 is attached to the right end surface of the input/output pulley 10 to cover the annular space 10i receiving the carrier assembly 40. The cover 37 has an outside diameter equal to that of the input/output pulley 10. A peripheral part 37a of the cover 37 is fastened to the end surface of the cylindrical part 10e of the input/output pulley 10 by screwing bolts 38 in threaded holes 10f. An inner peripheral part of the cover 37 is bent inward to form an inner cylindrical part 37b. The seal ring 33 is fitted in the inner cylindrical part 37b. Thus, the cover 37 covers the annular space 10i receiving the carrier assembly 40 hermetically to define an oil chamber 39.

The radial bearings 27, 29 and 30 are arranged in the plane L passing the middle of the belting part 10d of the input/output pulley 10 in the oil chamber 39. The flat, annular part 10b, the rim 10c, and the combination of the cover 37, the seal ring 33 and the carrier 42 serve as the inner end wall, i.e., left end wall as viewed in FIG. 2, the circumferential wall and the outer end wall, respectively, of the oil chamber 39.

Since the planetary gear 41 and the centrifugal clutch 50 forming the speed-change mechanism are received in the oil chamber 39 inside the input/output pulley 10, the control system is compact, and the speed-change mechanism can be lubricated to a necessary and sufficient extent.

Oil is poured through the threaded hole 10f opening into the groove 10g into the oil chamber 39, and the bolt 38 is screwed in the same threaded hole 10f to complete the assembling work.

The mechanical module 20 is assembled by the foregoing assembling process and can be readily disassembled by reversing the assembling process. Thus, the mechanical module 20 can be easily assembled and disassembled.

The three grooves 10g formed at equal angular intervals in the inner circumference of the input/output pulley 10 can be used as drain grooves for adjusting the oil level in the oil chamber 39. The grooves 10g stir the oil to lubricate the gears and the bearings when the input/output pulley 10 rotates in a neutral state.

The seal ring 33 is disposed at a radial position near the axis of the crankshaft 2 where centrifugal oil pressure is low, prevents missealing and oil leakage. When the input/output pulley 10 is at a standstill, the oil surface S is at a level indicated by a broken line in FIG. 2 below the level of the seal ring 33, so that the oil leaks hardly even while the input/output pulley 10 is at a standstill.

Since the oil passage 2c and the threaded hole 2b of the crankshaft 2 communicate with the oil passage 35a of the crankshaft bolt 35, and the oil passage 35a communicates with the space inside the sleeve 26 by means of the radial oil passage 35b, the oil can be supplied into the oil chamber 39 through the crankshaft 2 when necessary.

The auxiliary machinery drive belt 11 is wound around the input/output pulley 10 of the mechanical module 20 mounted on the crankshaft 2, the respective pulleys 5a, 6a, 7a and 8a of the starting motor 5, the air conditioner 6, the water pump 7 and the oil pump 8.

In starting the internal combustion engine 1, the band brake 21 is applied to use the starting motor 5 for its principal purpose.

When the band brake 21 is applied, the one-way clutch 25 is locked to keep the sun gear 28a stationary. The driving force of the starting motor 5 is transmitted to the input/output pulley 10 and the ring gear 45a by the auxiliary machinery drive belt 11 to drive the input/output pulley 10 and the ring gear 45a for rotation. Consequently, thrust produced by the planetary gear 41 disengages the centrifugal clutch 50, the planetary gear 41 serves as a reduction gear having a gear ratio in the range of 1.4 to 1.6 to drive the crankshaft 2 through the carrier 42 at a reduced rotating speed by an amplified torque to start the internal combustion engine 1.

When the band brake 21 is released, the sun gear 28a becomes free to rotate, the planetary gear 41 is neutralized, the power of the starting motor 5 is not transmitted to the crankshaft 2 and, consequently, the starting motor 5 drives only the auxiliary machinery including the air conditioner 6, the water pump 7 and the oil pump 8 efficiently.

After the internal combustion engine 1 has been started, the starting motor 5 stops functioning as a drive motor. As the engine speed increases beyond a threshold engine speed, the centrifugal clutch 50 is engaged. Then, the carrier 42 fastened to the crankshaft 2 is directly connected to the ring gear 45a rotating together with the input/output pulley 10 to set the planetary gear for a gear ratio of 1. Consequently, the starting motor 5 is driven through the auxiliary machinery drive belt 11 to use the starting motor 5 as a power generator. Consequently, energy can be efficiently regenerated.

Although the one-way clutch 25 permits the sun gear 28a to rotate and hence the input/output pulley 10 is free to rotate even in a state where the band brake 21 is applied, it is desirable to release the band brake 21 to avoid power consumption.

Since the band brake 21 is connected to and held on the chain case 12 by the band 23 wound around the cylindrical body 22a of the brake drum 22, the chain case 12 can be effectively used as a load-bearing member for fixing the sun gear 28a, i.e., a reaction member, through the one-way clutch 25.

The carrier 42 is fastened to the crankshaft 2, and the ring gear 45a is connected to the input/output pulley 10 in the speed-change mechanism including the planetary gear 41, and the speed-change mechanism is designed such that its gear ratio is in the range of 1.4 to 1.6, taking into consideration braking performance and starting time.

If the speed-change mechanism includes a planetary gear having a carrier fastened to the crankshaft 2, a sun gear connected to the input/output pulley 10, the speed-change mechanism has a high gear ratio in the range of about 2.4 to about 4.3.

However, when the planetary gear 41 is installed in the space defined by the input/output pulley 10, the speed-change mechanism mentioned above, in which the ring gear 45a is connected to the input/output pulley 10, and the sun gear 28a is disposed near the axis of the crankshaft 2 so as to be connectable to the chain case, is desirable for effective space utilization.

If a planetary gear having a high gear ratio is used, reaction torque increases, adversely affecting the performance of the brake and the one-way clutch and the rigidity of the chain case and, as a consequence, a high-performance brake, a high-performance one-way clutch and a chain case having a high rigidity are needed and the cost increases.

Simulation of restarting an internal combustion engine showed that time necessary to start the internal combustion engine did not decrease drastically, the starting motor needed to be driven at a high operating speed, energy loss increased and differential rotation that must be absorbed during speed change increased excessively, when a planetary gear having a gear ratio of 2 or above was used.

Thus, in the speed-change mechanism employed in the embodiment of the present invention, the carrier 42 is fastened to the crankshaft 2, the ring gear 45a is connected to the input/output pulley 10, and the planetary gear has a gear ratio in the range of about 1.4 to about 1.6.

In the speed-change mechanism employed in the embodiment of the present invention, the carrier 42 and the ring gear 45a, namely, input and output members, are connected directly when the multiple-disk centrifugal clutch 50, namely, a lock-up clutch, is engaged. Although the sun gear 28a, namely, a reaction member, may be connected directly to an input member or an output member by a lock-up clutch, it is most suitable to connect an input and an output member directly in view of torque transmission in a directly connected state.

Even if necessary clutch capacity can be reduced by directly connecting a reaction member, and an input or an output member, power is transmitted to the output member by a gear train. Such a mode of power transmission is not preferable because the rotation of the crankshaft varies, the NV characteristic (noise vibration characteristic) becomes worse due to the vibration of the crankshaft, and a speed-change mechanism of a very complicated configuration is needed.

Thus, the speed-change mechanism included in the embodiment of the present invention employs a simple mechanism that connects the carrier 42, namely, an input member, and the ring gear 45a, namely, an output member, directly by the centrifugal clutch 50, and has excellent NV characteristic.

What is claimed is:

1. An automotive internal combustion engine control system that transmits an output of a starting motor through an endless transmission belt to an input/output pulley mounted on an output shaft of an internal combustion engine in starting the internal combustion engine, transmits an output of the internal combustion engine through the endless transmission belt to auxiliary machinery while the internal combustion engine is in operation, and transmits an output of the starting motor through the endless transmission belt to the auxiliary machinery while the internal combustion engine is at an intentional standstill;

wherein said starting motor has a power generating function; and said automotive internal combustion engine control system includes a speed-change mechanism which transmits rotation of the starting motor to the internal combustion engine at a high first gear ratio in starting the internal combustion engine and which transmits rotation of the internal combustion engine to the starting motor at a low second gear ratio to operate the starting motor as a power generator while the internal combustion engine is in operation, said speed-change mechanism being built within the input/output pulley of the internal combustion engine.

2. The automotive internal combustion engine control system according to claim 1, wherein the speed-change mechanism is disposed so as to overlap the input/output pulley at least partially with respect to an axial direction in which the output shaft of the internal combustion engine extends.

3. The automotive internal combustion engine control system according to claim 1, wherein the input/output pulley defines an interior space opening in a direction opposite a direction toward the internal combustion engine, and the speed-change mechanism is received in the space.

4. The automotive internal combustion engine control system according to claim 1, wherein the speed-change mechanism includes:

a planetary gear including mutually meshed gears serving as a sun gear, planet pinions and a ring gear, and a carrier supporting the planet pinions for rotation, said meshed gears being helical gears;

a one-way clutch interposed between a stationary part and the sun gear; and a centrifugal clutch that engages the carrier and the ring gear by the agency of centrifugal force of a predetermined level or above, and that is disengaged by thrust produced by the helical gears.

5. The automotive internal combustion engine control system according to claim 4, wherein a sleeve is put on the output shaft of the internal combustion engine, a cylindrical sun gear member with the sun gear is put on the sleeve, the input/output pulley has an inner cylindrical part mounted on the output shaft of the internal combustion engine and an outer cylindrical part formed integrally with the inner cylindrical part so as to surround the latter, and the inner cylindrical part surrounds the sun gear member.

6. The automotive internal combustion engine control system according to claim 5, wherein the outer cylindrical part extends in a direction opposite a direction toward the internal combustion engine such that the outer cylindrical part and the sun gear member define an annular space.

7. The automotive internal combustion engine control system according to claim 5, wherein an inside surface of the sleeve is interlocked with the carrier for torque transmission.

8. The automotive internal combustion engine control system according to claim 6, wherein the planet pinions (43), the ring gear and the centrifugal clutch are received in the annular space.

9. The automotive internal combustion engine control system according to claim 1, wherein the speed-change mechanism comprises:

a planetary gear including mutually meshed gears serving as a sun gear, planet pinions and a ring gear, and a carrier supporting the planet pinions, said mutually meshed gears being helical gears;

the carrier being fastened to an output shaft of the internal combustion engine, the ring gear being connected to the input/output pulley, the sun gear being interlocked with a stationary member by a one-way clutch; and a centrifugal clutch that engages the carrier and the ring gear by the agency of centrifugal force that acts on weights, and that is disengaged by thrust produced by the helical gears.

10. An automotive internal combustion engine control system that transmits an output of a starting motor through an endless transmission belt to an input/output pulley mounted on an output shaft of an internal combustion engine in starting the internal combustion engine, transmits an output of the internal combustion engine through the endless transmission belt to auxiliary machinery while the internal combustion engine is in operation, and transmits an output of the starting motor through the endless transmission belt to the auxiliary machinery while the internal combustion engine is at an intentional standstill;

wherein said starting motor has a power generating function; and said automotive internal combustion engine control system includes a speed-change mechanism which transmits rotation of the starting motor to the internal combustion engine at a high first gear ratio in starting the internal combustion engine and which transmits rotation of the internal combustion engine to the starting motor at a low second gear ratio to operate the starting motor as a power generator while the internal combustion engine is in operation, said speed-change mechanism being built within the input/output pulley of the internal combustion engine, wherein an oil chamber for containing lubricating oil is formed inside the input/output pulley.

11. The automotive internal combustion engine control system according to claim 10, wherein the input/output pulley has an inner cylindrical part mounted on an output shaft of the internal combustion engine, an outer cylindrical part surrounding the inner cylindrical part and a flat, annular part connecting the inner and the outer cylindrical part, and the oil chamber is defined by a cover covering an annular space defined by the input/output pulley, the inner cylindrical part, the outer cylindrical part and the flat, annular part.

\* \* \* \* \*